United States Patent
Zhang et al.

(10) Patent No.: US 12,030,817 B2
(45) Date of Patent: Jul. 9, 2024

(54) MULTICOLOR LIGHT-STORING CERAMIC FOR FIRE-PROTECTION INDICATION AND PREPARATION METHOD THEREOF

(71) Applicants: Jiangsu Normal University, Xuzhou (CN); Xuzhou All-To Photoelectric Technology Co., LTD, Xuzhou (CN)

(72) Inventors: Le Zhang, Xuzhou (CN); Shunshun Yang, Xuzhou (CN); Rui Wang, Xuzhou (CN); Jin Huang, Xuzhou (CN); Zhanran Wang, Xuzhou (CN); Xiaoyu Zhu, Xuzhou (CN); Jian Kang, Xuzhou (CN); Can Huang, Xuzhou (CN); Bingheng Sun, Xuzhou (CN); Tianyuan Zhou, Xuzhou (CN); Hao Chen, Xuzhou (CN)

(73) Assignees: JIANGSU NORMAL UNIVERSITY, Xuzhou (CN); XUZHOU ALL-TO PHOTOELECTRIC TECHNOLOGY CO., LTD, Xuzhou (CN)

( * ) Notice: Subject to any disclaimer, the term of this patent is extended or adjusted under 35 U.S.C. 154(b) by 304 days.

(21) Appl. No.: 17/539,387

(22) Filed: Dec. 1, 2021

(65) Prior Publication Data

US 2022/0089498 A1    Mar. 24, 2022

Related U.S. Application Data

(63) Continuation of application No. PCT/CN2019/096259, filed on Jul. 17, 2019.

(30) Foreign Application Priority Data

Jul. 2, 2019   (CN) .......................... 201910587345.4

(51) Int. Cl.
    *C04B 35/14*    (2006.01)
    *B28B 3/02*     (2006.01)
    (Continued)

(52) U.S. Cl.
    CPC ............... *C04B 35/14* (2013.01); *B28B 3/02* (2013.01); *B28B 3/083* (2013.01); *B28B 11/243* (2013.01);
    (Continued)

(58) Field of Classification Search
    None
    See application file for complete search history.

(56) References Cited

U.S. PATENT DOCUMENTS 5,271,754 A * 12/1993 Bauerecker ............. C03C 3/089
                                                         65/17.6
10,519,612 B1 * 12/2019 Toma .................... C04B 18/023
(Continued)

FOREIGN PATENT DOCUMENTS

CN          203383437 U  *  1/2014
CN          104151692 A  * 11/2014  ............. B29C 47/92
(Continued)

*Primary Examiner* — Benjamin A Schiffman
(74) *Attorney, Agent, or Firm* — WPAT, P.C

(57) ABSTRACT

A multicolor light-storing ceramic for fire-protection indication and a preparation method thereof are provided. The preparation method includes: adding a glass based raw material, a light-storing powder, a dispersant and an alumina powder into a granulator, adding water mixed with a pore-forming agent and then mechanically stirring for granulation; adding a plasticizer after the stirring of 4~8 h, and continuing the stirring for 1~3 h to thereby obtain a mixture; packing the mixture into a mold and performing tableting; demolding and obtaining a light-storing self-luminous quartz ceramic by drying and firing using a kiln; printing a pattern onto a surface of the ceramic and then curing to obtain a light-storing ceramic for indication sign. Using an industrial waste glass has advantages of low sintering temperature and green environmental protection; dispersed pores and alumina introduced as scattering sources improves (Continued)

translucent jade (glass base)    high efficiency light-storing powder (dispersed phase)

light absorption efficiency, fluorescence output phase ratio and light transmission of the ceramic.

4 Claims, 2 Drawing Sheets

(51) Int. Cl.
| | |
|---|---|
| *B28B 3/08* | (2006.01) |
| *B28B 11/24* | (2006.01) |
| *B41M 1/34* | (2006.01) |
| *C04B 35/622* | (2006.01) |
| *C04B 35/626* | (2006.01) |
| *C04B 35/636* | (2006.01) |
| *C04B 35/64* | (2006.01) |
| *C04B 38/06* | (2006.01) |
| *C04B 41/00* | (2006.01) |
| *C04B 41/45* | (2006.01) |
| *C04B 41/50* | (2006.01) |
| *C04B 41/81* | (2006.01) |
| *C04B 41/85* | (2006.01) |
| *C09K 11/77* | (2006.01) |
| *C04B 111/28* | (2006.01) |
| *C04B 111/80* | (2006.01) |

(52) U.S. Cl.
CPC ......... *B41M 1/34* (2013.01); *C04B 35/62204* (2013.01); *C04B 35/6263* (2013.01); *C04B 35/62655* (2013.01); *C04B 35/62695* (2013.01); *C04B 35/6365* (2013.01); *C04B 35/64* (2013.01); *C04B 38/0645* (2013.01); *C04B 41/009* (2013.01); *C04B 41/4572* (2013.01); *C04B 41/50* (2013.01); *C04B 41/81* (2013.01); *C04B 41/85* (2013.01); *C09K 11/7734* (2013.01); *C09K 11/7792* (2013.01); *C04B 2111/28* (2013.01); *C04B 2111/807* (2013.01); *C04B 2235/3208* (2013.01); *C04B 2235/3217* (2013.01); *C04B 2235/36* (2013.01); *C04B 2235/5436* (2013.01); *C04B 2235/5445* (2013.01); *C04B 2235/5454* (2013.01); *C04B 2235/6562* (2013.01); *C04B 2235/6567* (2013.01); *C04B 2235/9646* (2013.01)

(56) References Cited

U.S. PATENT DOCUMENTS

| | | | | |
|---|---|---|---|---|
| 10,889,524 | B2* | 1/2021 | Tanaka | C04B 35/638 |
| 11,245,243 | B2* | 2/2022 | Li | C04B 37/023 |
| 2009/0272995 | A1* | 11/2009 | Ito | C08K 3/28 |
| | | | | 252/301.36 |
| 2022/0089499 | A1* | 3/2022 | Zhang | C04B 35/14 |

FOREIGN PATENT DOCUMENTS

| | | | | |
|---|---|---|---|---|
| CN | 104193346 A | * | 12/2014 | |
| CN | 109467453 A | * | 3/2019 | ............. C04B 35/10 |
| CN | 112028481 B | * | 3/2022 | ............. C03B 19/06 |
| KR | 20150116576 A | * | 10/2015 | |
| KR | 20230029126 A | * | 3/2023 | |
| WO | WO-2021000343 A1 | * | 1/2021 | ............. C04B 35/14 |

\* cited by examiner

MULTICOLOR LIGHT-STORING CERAMIC FOR FIRE-PROTECTION INDICATION AND PREPARATION METHOD THEREOF

TECHNICAL FIELD

The disclosure relates to the field of light-storing ceramic preparation technologies, in particular to a multicolor light-storing ceramic for fire-protection indication and a preparation method thereof.

BACKGROUND

Light-storing self-luminous materials (hereinafter referred to as light-storing materials) is a material that is irradiated by a light source and can still emit light by itself within a certain time after the light source disappears. This special material can emit light at night or in the dark after being irradiated by a sunlight or a light, so there is no energy consumption and battery hidden danger, and there is no need to lay circuits. It has excellent physical and chemical properties such as good chemical stability and long luminescence time. It is widely used in various fields such as building decoration, transportation, fire safety, electronic communication, subway tunnels, printing and dyeing, billboards, jewelry and so on.

At present, in the research of light-storing materials for fire-protection indication, carrier materials of light-storing products used at home and abroad include thin aluminum plate (on which the light-storing material pattern is printed), plastic, ink, resin and other materials that can be shaped after treatment at room temperature or lower temperature. There are a structure of "luminous coating and matrix", such as Chinese patent application No. CN01231697.0 (corresponding to Chinese patent publication No. CN2498156Y), Chinese patent publication No. CN102271912A, etc; a structure of "layered composite", such as Chinese patent publication Nos. CN108727734A, CN103835465A, CN101508530A, CN203021440U, etc; a structure of "simple coating", such as Chinese patent publication Nos. CN102765894A, CN101519507A, etc. However, although the above technology can generate a light-storing self-luminous effect, it will bring poor thermal shock due to the simple coating or mixing of luminous materials in the matrix. For example, it will accelerate the aging by being exposed to the outdoor sun in summer or raining suddenly, resulting in "slag dropping", especially in case of fire, the high temperature will easily cause the oxidation failure of luminescent powder or product melting; Moreover, due to the technical problems and the limitation that the thickness of the luminous coating is only 1-2 mm, this method obviously cannot provide enough luminous centers to realize high brightness indication or illumination, and its afterglow time is relatively short.

In view of the above problems, the concept of "light-storing transparent ceramics" came into being. In 2015, based on a principle of energy band engineering, Tanabe research group in Japan designed and prepared $Cr^{3+}$—$Eu^{3+}$ co-doped $Gd_3Al_{5-x}Ga_xO_{12}$ long-afterglow transparent ceramics, in which $Eu^{3+}$ ions assumed the function of electron capture and turned into $Eu^{2+}$, and the addition of $Ga^{3+}$ effectively realized the energy band cutting, thus changing the trap depth and realizing 730 nm deep red light emission under UV excitation, the one hour afterglow brightness is 25 times and 6 times that of $Cr^{3+}$: GGG and $Cr^{3+}$: $ZnGa_2O_4$, respectively; In 2016, the Brazilian scientist Professor R. S. Silva used laser sintering technology to prepare $SrAl_2O_4$:Eu, Dy translucent long-afterglow ceramics with transmittance of 40% in the range from 600 nm to 800 nm. However, due to laser sintering make $Eu^{3+}$ reduce to $Eu^{2+}$, and the afterglow time was only 45 min. However, due to the limited realization methods of afterglow trap of the light-storing transparent ceramics and the relatively high firing temperature, it is easy to cause heat damage or even oxidation failure of light-storing powder, short afterglow time and low brightness. In addition, the firing of transparent ceramics requires high-purity raw materials, which are expensive and the requirements of equipment conditions are extremely harsh, so the market application potential is extremely limited.

Compared with the above materials, quartz glass materials have advantages of high strength, good weather resistance, water resistance, easy surface cleaning, long service life and so on. The advantages of the light-storing material and quartz glass material are combined, that is, the light-storing self-luminous glass, which further improves the performance of the light-storing material products. For example, Chinese patent publication No. CN1317456A discloses a preparation method of borosilicate zinc long afterglow glass, but the preparation method needs to be heated at 1350° C.~1500° C. at most, and then prepared into light-storing glass through quenching or annealing process; Chinese patent publication No. CN1397509A discloses that in the process of conventional glass preparation, light-storing self-luminous materials are added in the molding process (900° C.~1300° C.) and then formed, or melted in secondary processing to add the light-storing self-luminescent raw materials, this process needs to be stirred, homogenized and clarified at high temperature; Chinese patent publication No. CN100586885C discloses that the long-afterglow luminescent material is first mixed with a glass powder to form a light-storing glass by a high-temperature solid-state method at 600° C.~1400° C. or a hot pressing sintering method, and then the light-storing glass is broken into glass blocks, then, combined with the conventional glass forming process, the glass blocks are rolled and bonded at 900° C.~1300° C. and cooled for forming; Chinese patent publication No. CN1505674A discloses that preparing the light-storing self-luminous artificial stone by adding the light-storing self-luminous powder into a material mixed the resin with one of inorganic bone material and filling material.

However, although the above technology combining the glass preparation and the light-storing self-luminous materials has some advantages, it is still accompanied by some problems:

(1) waste of resources, most of them need high temperature conditions above 900° C. or even 1300° C., which not only consumes a lot of energy, but also easily causes thermal damage or even oxidation failure of the light-storing powder;

(2) the process conditions are complex, the preparation process needs to reference transparent ceramic process or reference traditional glass preparation process, and even perform secondary processing, in particular, the process of adding light-storing powder into the molten state of the glass will not only cause a lot of waste of heat energy, but also bring major potential safety hazards to the staff;

(3) the equipment requirements are high, some disclosed technologies not only need high-temperature environmental equipment, but also need to be carried out under low-pressure conditions, and some need hot pressing sintering and atmosphere sintering, which greatly increases the operation difficulty and production cost;

(4) the light-storing efficiency is low, due to the large refractive index difference between the light-storing ceramic (refractive index is 1.45-1.56) and the air (refractive index is 1.0), the fluorescence is generated after being excited by external energy, when emitted from the upper surface of the ceramic, the total emission effect will be generated. After calculation, the critical angle of total reflection is 44°, that is, only 24.4% of the fluorescence can be emitted from the upper surface of the ceramic to realize the extraction of front light, the remaining fluorescence is limited by the total reflection effect and will be transmitted in the form of waveguide effect inside the ceramic until it is completely lost.

SUMMARY

The disclosure provides a multicolor light-storing ceramic for fire-protection indication and a preparation method thereof, which have advantages of simple preparation steps, easy material preparation and low cost.

In order to achieve the above purpose, the disclosure adopts the following technical scheme: a preparation method of a multicolor light-storing ceramic for fire-protection indication, including:

step (1) adding a glass based raw material, a long-afterglow light-storing powder (also referred as light-storing powder), a dispersant and an alumina powder into a granulator, adding water mixed with a pore-forming agent into the granulator, and then mechanically stirring for granulation by the granulator; adding a plasticizer into the granulator after the stirring of 4~8 hours(h), and continuing the stirring for 1~3 h to thereby obtain a mixture; the mixture is a paste, a mortar or a viscous substance, a stirring speed of the stirring is in a range from 100 radians per minute (rad/min) to 300 rad/min; the glass based raw material includes a recycled float glass waste or a recycled industrial waste glass;

step (2) packing the mixture obtained in the step (1) into a mold, performing tabletting to the mixture packed into the mold by an automatic tablet presser; a shape of the mold is required for target product requirements, a pressure during performing the tabletting is in a range from 5 megapascals (MPa) to 40 MPa, a pressure holding time during performing the tabletting is in a range from 5 seconds (s) to 20 s; and then demolding to obtain a green body and subsequently delivering the green body to a kiln for drying and firing;

step (3) drying and firing the green body in the kiln, including: heating from room temperature to 200 Celsius degrees (° C.) at a rate of 2~5 Celsius degrees per minute (° C./min) and then holding for 10~30 minutes (min) to ensure complete evaporation of the water in the green body; then continuing to heat up to 400~900° C. and holding for 60~120 min to ensure that a colorless glass powder completes the crystallization, crystal nucleus growth and pore discharge process in a semi molten state, and will not cause thermal damage to long-afterglow self-luminous materials; and subsequently cooling down to below 100° C. with the kiln and taking out to obtain a light-storing self-luminous quartz ceramic;

step (4) printing a pattern onto a surface of the light-storing self-luminous quartz ceramic, and then curing the light-storing self-luminous quartz ceramic with the pattern under a temperature in a range from 300° C. to 600° C. for 20~40 min to obtain a light-storing ceramic for indication sign.

Further, the long-afterglow light-storing powder includes: an aluminate system such as $CaAl_3O_4$:Eu,Nb, $Sr_4Al_{14}O_{25}$: Eu,Dy, $SrAl_2O_4$:Eu,Dy, etc; a silicate system such as pyro silicate blue powder activated by Eu and Dy, orthosilicate white luminescent powder activated by Mg and so on; a sulfide system such as ZnS: Cu series with yellow and green, CaS:Bi series with blue, CaS:Eu Series with red and so on.

Further, in the step (1), a particle size of the glass based raw material is in a range from 10 micrometers (μm) to 400 μm; a particle size of the long-afterglow light-storing powder is in a range from 10 μm to 500 μm; a particle size of the alumina powder is in a range from 10 nanometers (nm) to 500 nm; the dispersant is a sodium tripolyphosphate (STPP); the pore-forming agent is a natural organic fine powder; and the plasticizer is a methyl cellulose.

Further, in the step (1), a mass ratio of the glass based raw material to the long-afterglow light-storing powder is 9~49: 1; an adding amount of the dispersant accounts for 0.1~0.6% of a total mass of the glass based raw material and the long-afterglow light-storing powder; an adding amount of the plasticizer accounts for 0.1~0.9% of the total mass of the glass based raw material and the long-afterglow light-storing powder; an adding amount of the pore-forming agent accounts for 0.1~0.4% of the total mass of the glass based raw material and the long-afterglow light-storing powder; an adding amount of the alumina powder accounts for 0.1~0.4% of the total mass of the glass based raw material and the long-afterglow light-storing powder; and an adding amount of the water accounts for 20~50% of the total mass of the glass based raw material and the long-afterglow light-storing powder.

Further, another raw material added in the granulator in the step (1) includes a pigment matched with luminescence of the long-afterglow light-storing powder and required to beautify or meet special requirements of a product, and a mass ratio of the pigment to the long-afterglow light-storing powder is less than 3.5.

In addition, an embodiment also provides a multicolor light-storing ceramic for fire-protection indication prepared by the above preparation method, and the multicolor light-storing ceramic can be observed to emit the blue-green light in the dark.

Compared with the related art, the embodiments of the disclosure have the following beneficial effects:

1. one of main raw materials of the embodiment is a colorless glass powder (also referred as the glass based raw material), the colorless glass powder is the recycled float glass waste or the recycled industrial waste glass, it has advantages such as a wide range of sources, a low price and a lowest melting point can be to 400° C., and as a green recycled energy. Compared with the related art, using this raw material not only greatly reduces the energy consumption and cost, but also facilitates the recycling of waste building glass and glass residues and reduces the environmental pressure.

2. compared with the related art, the embodiment adopts one-time mechanical mixed pressing blank firing, without high-temperature conditions, crucible auxiliary forming, hot pressing and atmosphere sintering, the production process is extremely simple and fast, avoids a crushing of the crucible during sampling and a procurement of relevant high-precision firing equipment, and greatly reduces the energy consumption and equipment procurement cost, greatly improves the safety factor of the staff.

3. controllable introduction of dispersed pores and alumina as scattering source to further improve the light absorption efficiency and fluorescence output phase ratio of ceramics; the alumina phase as the scattering source can also be used as the light transmission medium, and improve the light transmission characteristics of ceramics, showing the effect of jade; the ceramic product obtained by the embodiment has smooth surface, jade quality and no defects, and the size of the ceramic product is up to length/width in a range from 100 mm to 300 mm and a thick in a range from 3 mm to 20 mm; the ceramic product emits light with typical emission wavelengths of 520 nm green light and 470 nm sky blue light, etc; under a condition of 20 min light-storing, 720 min continuous luminescence can be achieved: an initial light intensity during emitting light for one minute is greater than 4000 mcd/m$^2$; a light intensity during emitting light for 60 min is greater than 400 mcd/m$^2$; a light intensity during emitting light for 720 min is greater than 5 mcd/m$^2$ (the ceramic product is exposed to outdoor direct sunlight for 20 min, or the ceramic product is exposed to fluorescent lamp for 30 min, or the ceramic product is exposed to ultraviolet for 5 min, room temperature at 25° C. for testing);

4. a service life is the same as that of building ceramics, at least 15 years without aging, and more than 8 years in water. The excellent performance of the product of the embodiment can be competent for material for fire-protection indication.

BRIEF DESCRIPTION OF THE DRAWINGS

In order to more clearly explain the embodiments of the disclosure or the technical solutions in the related art, the following will briefly introduce the drawings that need to be used in the description of the embodiments or the related art. Obviously, the drawings in the following description are only the embodiments of the disclosure, and for those of ordinary skill in the art, other drawings can be obtained without creative efforts according to the provided drawings.

DETAILED DESCRIPTION OF THE EMBODIMENTS

Figure 1:
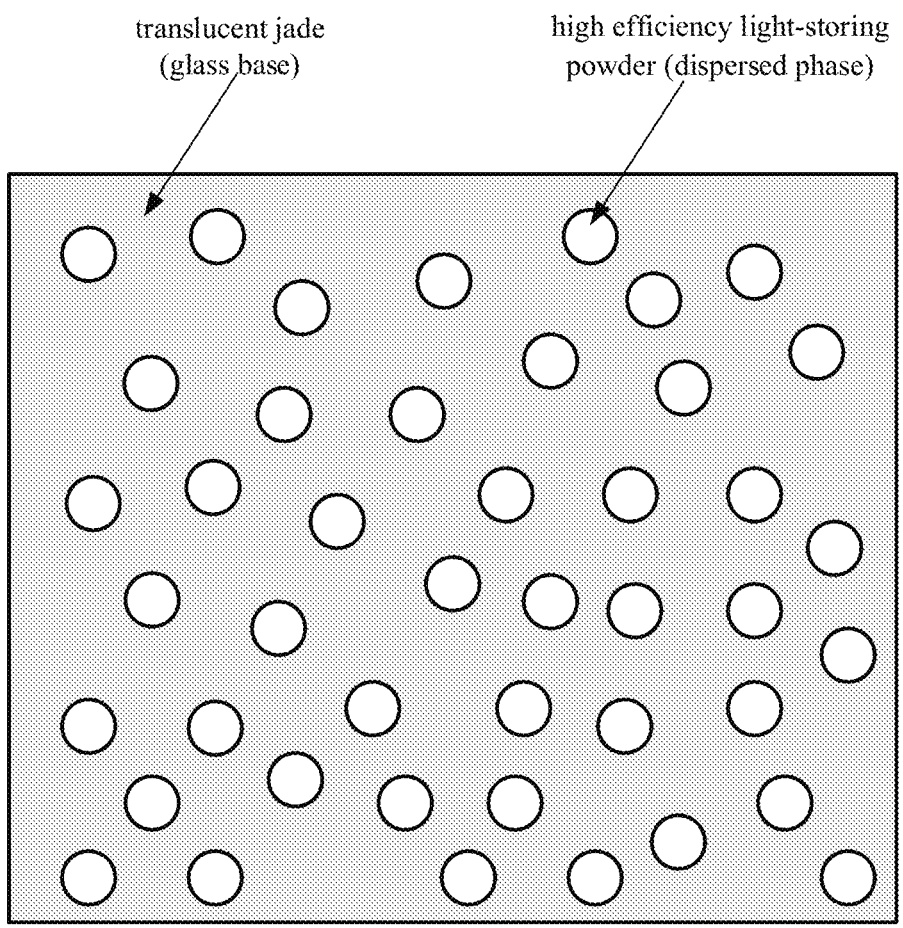
FIG. 1 is a schematic view of a light-storing ceramic of the disclosure.

The disclosure will be further described in detail below with reference to the drawings and specific embodiments.

In the following embodiments, unless otherwise specified, the described experimental methods are usually implemented under conventional conditions or conditions recommended by the manufacturer; the raw materials and reagents used are all commercially available products.

Formulations of following six embodiments are shown in the table below.

| serial number | light-storing powder (%) | glass based raw material (also referred as glass powder) (%) | dispersant (%) | alumina powder (%) | pore-forming agent (%) | plasticizer (%) | water (%) |
|---|---|---|---|---|---|---|---|
| 1 | 2 | 98 | 0.1 | 0.4 | 0.1 | 0.1 | 50 |
| 2 | 10 | 90 | 0.4 | 0.4 | 0.1 | 0.6 | 20 |
| 3 | 2 | 98 | 0.3 | 0.2 | 0.3 | 0.3 | 50 |
| 4 | 10 | 90 | 0.6 | 0.3 | 0.2 | 0.5 | 20 |
| 5 | 6 | 94 | 0.2 | 0.1 | 0.4 | 0.9 | 40 |
| 6 | 8 | 92 | 0.1 | 0.2 | 0.3 | 0.8 | 30 |

First Embodiment

A specific preparation method includes:

step (1) adding a glass based raw material with a particle size of 400 μm, a long-afterglow light-storing powder (Sr$_4$Al$_{14}$O$_{25}$:Eu,Dy) with a particle size of 500 μm, a sodium tripolyphosphate as a dispersant and an alumina powder with a particle size of 500 nm into a granulator, adding water mixed with a small amount of a natural organic fine powder as a pore-forming agent with a particle size of 0.5 μm into the granulator, and then directly mechanically stirring for granulation by the granulator; adding a methyl cellulose as a plasticizer into the granulator after the stirring of 8 h, and continuing the stirring for 3 h to thereby obtain a mixture; the mixture is a paste, a mortar or a viscous substance, a stirring speed of the stirring is 300 rad/min; the glass based raw material includes a recycled float glass waste or a recycled industrial waste glass;

step (2) packing the mixture obtained in the step (1) into a mold, performing tabletting to the mixture packed into the mold by an automatic tablet presser; a shape of the mold is a square (20 cm*20 cm), a pressure during performing the tabletting is 40 MPa, a pressure holding time during performing the tabletting is 20 s; and then demolding to obtain a green body and subsequently delivering the green body to a kiln for drying and firing;

step (3) drying and firing the green body in the kilnm including: heating from room temperature to 200° C. at a rate of 5° C./min and then holding for 30 min to ensure the complete evaporation of water in the green body; then continuing to heat up to 900° C. at a rate of 3° C./min and holding for 120 min to ensure that the colorless glass powder completes the crystallization, crystal nucleus growth and pore discharge process in a semi molten state, and will not cause thermal damage to long-afterglow self-luminous materials; and subsequently cooling down to below 100° C. with the kiln and taking out to obtain a light-storing self-luminous quartz ceramic;

step (4) printing a pattern onto a surface of the light-storing self-luminous quartz ceramic (also referred ceramic product), and then curing the light-storing self-luminous quartz ceramic with the pattern under a temperature in 300° C. for 20 min to obtain a light-storing ceramic for indication sign.

FIG. 1 is a schematic view of the light-storing ceramic of the disclosure. In the FIG. 1, the circles represent the long-afterglow light-storing powder (dispersed phase), and the rest is the glass base (continuous phase), it indicates that the ceramic can emit light throughout the body.

Figure 2:
FIG. 2 is a physical image of the light-storing ceramic according to a first embodiment of the disclosure.

FIG. 2 is a physical image of the light-storing ceramic according to the first embodiment of the disclosure, the light-storing ceramic can be observed to emit a blue-green light in the dark.

Figure 3:
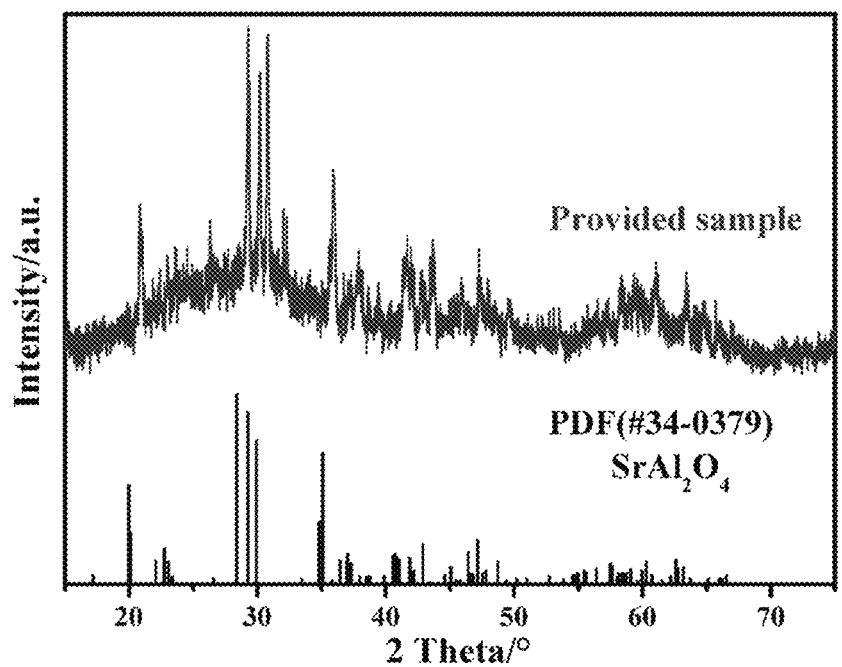
FIG. 3 is an X-ray diffraction diagram of the light-storing ceramic prepared in the first embodiment of the disclosure.

FIG. 3 is an X-ray diffraction (XRD) diagram of the light-storing ceramic prepared in the first embodiment. XRD test results show that X-ray diffraction peaks of the light-storing ceramic prepared in the first embodiment are consistent with the standard card of strontium aluminate (PDF (#34-0379)). In addition, the XRD diagram shows a very obvious steamed bread peak in the diffraction angle range of 20-40, which proved the existence of amorphous silicon dioxide.

Figure 4:
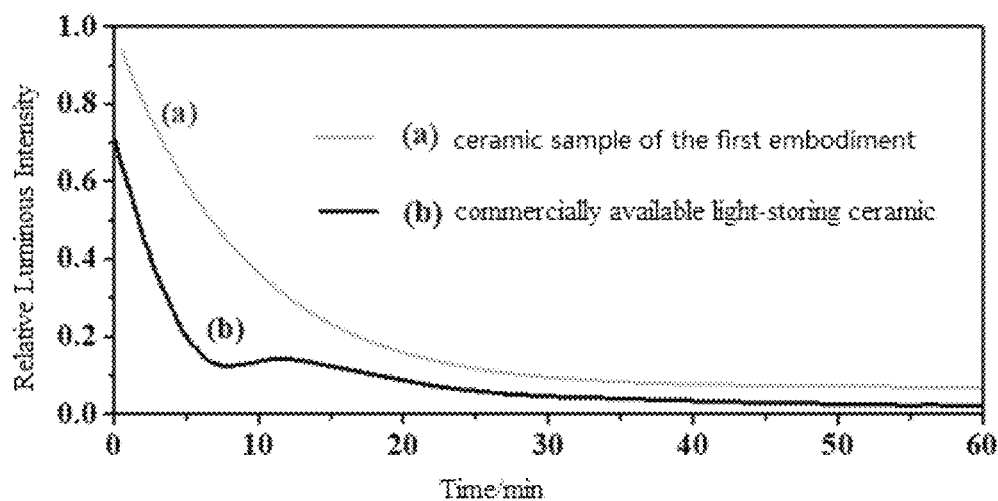
FIG. 4 is a comparison diagram of luminescence and afterglow times between the light-storing ceramic prepared in the first embodiment of the disclosure and a commercially available light-storing ceramic.

FIG. 4 is a comparison diagram of luminescence and afterglow times between the light-storing ceramic prepared in the first embodiment and a commercially available light-storing ceramic, the test results show that the initial intensity of the light-storing ceramic prepared by this method has increased by 26%.

Second Embodiment

A specific preparation method includes:
step (1) adding a glass based raw material with a particle size of 400 μm, a long-afterglow light-storing powder ($Sr_4Al_{14}O_{25}$:Eu,Dy) with a particle size of 500 μm, a sodium tripolyphosphate as a dispersant and an alumina powder with a particle size of 500 nm into a granulator, adding water mixed with a small amount of a natural organic fine powder as a pore-forming agent with a particle size of 0.5 μm into the granulator, and then directly mechanically stirring for granulation by the granulator; adding a methyl cellulose as a plasticizer into the granulator after the stirring of 8 h, and continuing the stirring for 3 h to thereby obtain a mixture; the mixture is a paste, a mortar or a viscous substance, a stirring speed of the stirring is 300 rad/min; the glass based raw material includes a recycled float glass waste or a recycled industrial waste glass;
step (2) packing the mixture obtained in the step (1) into a mold, performing tabletting to the mixture packed into the mold by an automatic tablet presser; a shape of the mold is a square flake (20 cm*20 cm), a pressure during performing the tabletting is 40 MPa, a pressure holding time during performing the tabletting is 20 s; and then demolding to obtain a green body and subsequently delivering the green body to a kiln for drying and firing;
step (3) drying and firing the green body in the kiln, including: heating from room temperature to 200° C. at a rate of 5° C./min and then holding for 30 min to ensure the complete evaporation of water in the green body; then continuing to heat up to 900° C. at a rate of 3° C./min and holding for 120 min to ensure that the colorless glass powder completes the crystallization, crystal nucleus growth and pore discharge process in a semi molten state, and will not cause thermal damage to long-afterglow self-luminous materials; and subsequently cooling down to below 100° C. with the kiln and taking out to obtain a light-storing self-luminous quartz ceramic;
step (4) printing a pattern onto a surface of the light-storing self-luminous quartz ceramic (also referred ceramic product), and curing the light-storing self-luminous quartz ceramic with the pattern under a temperature in 300° C. for 20 min to obtain a light-storing ceramic for indication sign.

Third Embodiment

A specific preparation method includes:
step (1) adding a glass based raw material with a particle size of 10 μm, a long-afterglow light-storing powder ($SrAl_2O_4$:Eu,Dy) with a particle size of 10 μm, a sodium tripolyphosphate as a dispersant and an alumina powder with a particle size of 10 nm into a granulator, adding water mixed with a small amount of natural organic fine powder as a pore-forming agent with a particle size of 10 μm into the granulator and then directly mechanically stirring for granulation by the granulator; adding a methyl cellulose as a plasticizer into the granulator after the stirring of 4 h, and continuing the stirring for 1 h to thereby obtain a mixture; the mixture is a paste, a mortar or a viscous substance, a stirring speed of the stirring is 100 rad/min; the glass based raw material includes a recycled float glass waste or a recycled industrial waste glass;
step (2) packing the mixture obtained in the step (1) into a mold, performing tabletting to the mixture packed into the mold by an automatic tablet presser; a shape of the mold is a rectangle (20 cm*30 cm), a pressure during performing the tabletting is 5 MPa, a pressure holding time during performing the tabletting is 5 s; and then demolding to obtain a green body and subsequently delivering the green body to a kiln for drying and firing;
step (3) drying and firing the green body in the kiln, including: heating from room temperature to 200° C. at a rate of 5° C./min and holding for 10 min to ensure the complete evaporation of water in the green body; then continuing to heat up to 400° C. at a rate of 5° C./min and holding for 60 min to ensure that the colorless glass powder completes the crystallization, crystal nucleus growth and pore discharge process in a semi molten state, and will not cause thermal damage to long-afterglow self-luminous materials; and subsequently cooling down to below 100° C. with the kiln and taking out to obtain a light-storing self-luminous quartz ceramic;
step (4) printing a pattern onto a surface of the light-storing self-luminous quartz ceramic (also referred ceramic product), and curing the light-storing self-luminous quartz ceramic with the pattern under a temperature in 600° C. for 40 min to obtain a light-storing ceramic for indication sign.

Fourth Embodiment

A specific preparation method includes:
step (1) adding a glass based raw material with a particle size of 10 μm, a long-afterglow light-storing powder ($SrAl_2O_4$:Eu,Dy) with a particle size of 10 μnm, a sodium tripolyphosphate as a dispersant and an alumina powder with a particle size of 10 nm into a granulator, adding water mixed with a small amount of natural organic fine powder as a pore-forming agent with a particle size of 10 μm into the granulator and then directly mechanically stirring for granulation by the granulator; adding a methyl cellulose as a plasticizer into the granulator after the stirring of 4 h, and continuing the stirring for 1 h to thereby obtain a mixture; the mixture is a paste, a mortar or a viscous substance, a stirring speed of the stirring is 100 rad/min; the glass based raw material includes a recycled float glass waste or a recycled industrial waste glass;

step (2) packing the mixture obtained in the step (1) into a mold, performing tabletting to the mixture packed into the mold by an automatic tablet presser; a shape of the mold is a rectangle (20 cm*30 cm), a pressure during performing the tabletting is 5 Mpa, a pressure holding time during performing the tabletting is 5 s; and then demolding to obtain a green body and subsequently delivering the green body to a kiln for drying and firing;

step (3) drying and firing the green body in the kiln, including: heating from room temperature to 200° C. at a rate of 5° C./min and holding for 10 min to ensure the complete evaporation of water in the green body; then continuing to heat up to 400° C. at a rate of 5° C./min and holding for 60 min to ensure that the colorless glass powder completes the crystallization, crystal nucleus growth and pore discharge process in a semi molten state, and will not cause thermal damage to long-afterglow self-luminous materials; and subsequently cooling down to below 100° C. with the kiln and taking out to obtain a light-storing self-luminous quartz ceramic;

step (4) printing a pattern onto a surface of the light-storing self-luminous quartz ceramic (also referred ceramic product), and curing the light-storing self-luminous quartz ceramic with the pattern under a temperature in 600° C. for 40 min to obtain a light-storing ceramic for indication sign.

Fifth Embodiment

A specific preparation method includes:

step (1) adding a glass based raw material with a particle size of 300 μm, a long-afterglow light-storing powder ($SrAl_2O_4$:Eu,Dy) with a particle size of 200 μm, a sodium tripolyphosphate as a dispersant and an alumina powder with a particle size of 300 nm into a granulator, adding water mixed with a small amount of natural organic fine powder as a pore-forming agent with a particle size of 0.1 μm into the granulator and then directly mechanically stirring for granulation by the granulator; adding a methyl cellulose as a plasticizer into the granulator after the stirring of 6 h, and continuing the stirring for 2 h to thereby obtain a mixture; the mixture is a paste, a mortar or a viscous substance, a stirring speed of the stirring by the granulator is 200 rad/min; the glass based raw material includes a recycled float glass waste or a recycled industrial waste glass;

step (2) packing the mixture obtained in the step (1) into a mold, performing tabletting to the mixture packed into the mold by an automatic tablet presser; a shape of the mold is a square (20 cm*20 cm), a pressure during performing the tabletting is 30 MPa, a pressure holding time during performing the tabletting is 15 s; and then demolding to obtain a green body and subsequently delivering the green body to a kiln for drying and firing;

step (3) drying and firing the green body in the kiln, including: heating from room temperature to 200° C. at a rate of 3° C./min and holding for 30 min to ensure the complete evaporation of water in the green body; then continuing to heat up to 800° C. at a rate of 3° C./min and holding for 120 min to ensure that the colorless glass powder completes the crystallization, crystal nucleus growth and pore discharge process in a semi molten state, and will not cause thermal damage to long-afterglow self-luminous materials; and subsequently cooling down to below 100° C. with the kiln and taking out to obtain a light-storing self-luminous quartz ceramic;

step (4) printing a pattern onto a surface of the light-storing self-luminous quartz ceramic (also referred ceramic product), and curing the light-storing self-luminous quartz ceramic with the pattern under a temperature in 300° C. for 30 min to obtain a light-storing ceramic for indication sign.

Sixth Embodiment

A specific preparation method includes:

step (1) adding a glass based raw material with a particle size of 400 μm, a long-afterglow light-storing powder ($CaAl_3O_4$:Eu, Nb) with a particle size of 400 μm, a sodium tripolyphosphate as a dispersant and an alumina powder with a particle size of 300 nm into a granulator, adding water mixed with a small amount of natural organic fine powder as a pore-forming agent with a particle size of 0.8 μm into the granulator and then directly mechanically stirring for granulation by the granulator; adding a methyl cellulose as a plasticizer into the granulator after the stirring of 8 h, and continuing the stirring for 2 h to thereby obtain a mixture; the mixture is a paste, a mortar or a viscous substance, a stirring speed of the stirring is 150 rad/min; the glass based raw material includes a recycled float glass waste or a recycled industrial waste glass;

step (2) packing the mixture obtained in the step (1) into a mold, performing tabletting to the mixture packed into the mold by an automatic tablet presser; a shape of the mold is a square (20 cm*20 cm), a pressure during performing the tabletting is 25 MPa, a pressure holding time during performing the tabletting is 15 s; and then demolding to obtain a green body and subsequently delivering the green body to a kiln for drying and firing;

step (3) drying and firing the green body in the kiln, including: heating from room temperature to 200° C. at a rate of 2° C./min and holding for 30 min to ensure the complete evaporation of water in the green body; then continuing to heat up to 600° C. at a rate of 2° C./min and holding for 90 min to ensure that the colorless glass powder completes the crystallization, crystal nucleus growth and pore discharge process in a semi molten state, and will not cause thermal damage to long-afterglow self-luminous materials; and subsequently cooling down to below 100° C. with the kiln and taking out to obtain a light-storing self-luminous quartz ceramic;

step (4) printing a pattern onto a surface of the light-storing self-luminous quartz ceramic (also referred ceramic product), and curing the light-storing self-luminous quartz ceramic with the pattern under a temperature in 400° C. for 30 min to obtain a light-storing ceramic for indication sign.

In the above embodiment, the kiln for firing ceramics can be a roller kiln, a shuttle kiln or improved versions of these two kilns, such as a roller kiln capable of atmosphere sintering, a shuttle kiln capable of hot-pressing sintering or atmosphere sintering, etc.

The pigment for pattern printing can be an ordinary glass printing pigment or a ceramic printing pigment.

What is claimed is:

1. A preparation method of a multicolor light-storing ceramic for fire-protection indication, comprising:

step (1) adding a glass based raw material, a light-storing powder, a dispersant and an alumina powder into a granulator, adding water mixed with a pore-forming agent into the granulator, and then mechanically stirring for granulation by the granulator; adding a plasticizer into the granulator after the stirring of 4~8 hours (h), and continuing the stirring for 1~3h to thereby obtain a mixture; wherein a stirring speed of the stirring is in a range from 100 radians per minute (rad/min) to 300rad/min, and the glass based raw material comprises a recycled float glass waste or a recycled industrial waste glass;

step (2) packing the mixture obtained in the step (1) into a mold, performing tabletting to the mixture packed into the mold by an automatic tablet presser, and then demolding to obtain a green body and subsequently delivering the green body to a kiln for drying and firing; wherein a shape of the mold is required for target product requirements, a pressure during performing the tabletting is in a range from 5 megapascals (MPa) to 40 MPa, and a pressure holding time during performing the tabletting is in a range from 5 seconds (s) to 20s;

step (3) drying and firing the green body in the kiln, comprising: heating from room temperature to 200 Celsius degrees (° C.) at a rate of 2~5 Celsius degrees per minute (° C./min) and then holding for 10~30 minutes (min), then continuing to heat up to 400~900° C. and holding for 60~120 min, and subsequently cooling down to below 100° C. with the kiln and taking out to obtain a light-storing self-luminous quartz ceramic; and step (4) printing a pattern onto a surface of the light-storing self-luminous quartz ceramic, and then curing the light-storing self-luminous quartz ceramic with the pattern under a temperature in a range from 300° ° C.to 600° C. for 20~40 min to obtain a light-storing ceramic for indication sign.

2. The preparation method according to claim 1, wherein a particle size of the glass based raw material is in a range from 10 micrometers (μm) to 400 μm, a particle size of the light-storing powder is in a range from 10 μm to 500 μm, a particle size of the alumina powder is in a range from 10 nanometers (nm) to 500 nm, the dispersant is a sodium tripolyphosphate (STPP), the pore-forming agent is a natural organic fine powder, and the plasticizer is a methyl cellulose.

3. The preparation method according to claim 1, wherein a mass ratio of the glass based raw material to the light-storing powder is 9~49:1, an adding amount of the dispersant accounts for 0.1 ~ 0.6% of a total mass of the glass based raw material and the light-storing powder, an adding amount of the plasticizer accounts for 0.1~0.9% of the total mass of the glass based raw material and the light-storing powder, an adding amount of the pore-forming agent accounts for 0.1~0.4% of the total mass of the glass based raw material and the light-storing powder, an adding amount of the alumina powder accounts for 0.1~0.4% of the total mass of the glass based raw material and the light-storing powder, and an adding amount of the water accounts for 20~50% of the total mass of the glass based raw material and the light-storing powder.

4. The preparation method according to claim 1, wherein another raw material added in the granulator in the step (1) comprises a pigment matched with luminescence of the light-storing powder and required to beautify or meet special requirements of a product, and a mass ratio of the pigment to the light-storing powder is less than 3.5.

* * * * *